(12) United States Patent
Kuan et al.

(10) Patent No.: US 9,032,590 B2
(45) Date of Patent: May 19, 2015

(54) ROTATING MECHANISM AND ELECTRONIC DEVICE WITH SAME

(71) Applicant: HON HAI PRECISION INDUSTRY CO., LTD., New Taipei (TW)

(72) Inventors: Chang-Ming Kuan, New Taipei (TW); Ming-Chien Chiu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/133,422

(22) Filed: Dec. 18, 2013

(65) Prior Publication Data
US 2014/0167585 A1 Jun. 19, 2014

(30) Foreign Application Priority Data
Dec. 18, 2012 (TW) .............................. 101148044 A (51) Int. Cl.
 *E05D 7/00* (2006.01)
 *G06F 1/16* (2006.01)
(52) U.S. Cl.
 CPC ............ *E05D 7/0045* (2013.01); *G06F 1/1681* (2013.01)
(58) Field of Classification Search
 USPC ........... 16/354, 266, 268, 324, 327, 333, 343, 16/352; 379/433.11, 433.13; 361/679.12, 361/679.15, 679.16, 679.27; 348/333.06, 348/794; 248/419, 420, 274.1, 284.1, 248/286.1, 287.1, 288.11, 922, 923, 919; 455/575.3, 575.1
 See application file for complete search history.

(56) References Cited

U.S. PATENT DOCUMENTS

| 3,788,698 | A | * | 1/1974 | Perkins | 297/373 |
| 4,655,501 | A | * | 4/1987 | Ishigami et al. | 297/113 |
| 4,882,807 | A | * | 11/1989 | Frye et al. | 16/225 |
| 5,551,125 | A | * | 9/1996 | Adams | 16/229 |
| 5,815,886 | A | * | 10/1998 | Nishio et al. | 16/360 |
| 6,227,518 | B1 | * | 5/2001 | Sun | 248/371 |
| 6,233,784 | B1 | * | 5/2001 | Daoud | 16/257 |
| 6,354,549 | B2 | * | 3/2002 | Sweere et al. | 248/292.14 |
| 6,445,793 | B1 | * | 9/2002 | Vassallo et al. | 379/428.01 |
| 6,796,612 | B2 | * | 9/2004 | Shephard | 297/367 R |
| 7,147,191 | B2 | * | 12/2006 | Ichikawa et al. | 248/292.12 |
| 7,665,185 | B2 | * | 2/2010 | Vackar | 16/330 |
| 8,096,019 | B2 | * | 1/2012 | Lin et al. | 16/297 |
| 8,156,612 | B2 | * | 4/2012 | Yamashita | 16/354 |
| 8,220,759 | B2 | * | 7/2012 | Shimotoso | 248/133 |

(Continued)

FOREIGN PATENT DOCUMENTS

| TW | M285894 U | 1/2006 |
| TW | M322710 U | 11/2007 |
| TW | M432240 U1 | 6/2012 |

*Primary Examiner* — Chuck Mah
(74) *Attorney, Agent, or Firm* — Novak Druce Connolly Bove + Quigg LLP (57) ABSTRACT

An exemplary rotating mechanism for positioning a rotation angle of a second body relative to a first body is provided. The first body includes a pair of sidewalls. The second body includes a pair of connecting arms rotatably connected to the sidewalls. The rotating mechanism includes a pair of positioning gears rotatably connected to the sidewalls, a brake slidably connected to the first body, and a button fastened to the brake. Each of the positioning gears includes a positioning block extending out of the sidewalls. The brake is driven to brake the positioning gears by the button when the button is moved towards the sidewalls. The positioning block is fixed at a predetermined position to position the rotation angle of the second body when the positioning gears are braked.

19 Claims, 9 Drawing Sheets

(56) References Cited

U.S. PATENT DOCUMENTS

| | | | |
|---|---|---|---|
| 8,300,394 B2* | 10/2012 | Senatori | 361/679.27 |
| 8,385,991 B2* | 2/2013 | Wang et al. | 455/575.3 |
| 2005/0078818 A1* | 4/2005 | Bae | 379/433.13 |
| 2005/0122671 A1* | 6/2005 | Homer | 361/681 |
| 2006/0288534 A1 | 12/2006 | Lu | |
| 2012/0262857 A1* | 10/2012 | Fukaya et al. | 361/679.01 |
| 2013/0271901 A1* | 10/2013 | Lin | 361/679.01 |

\* cited by examiner

ROTATING MECHANISM AND ELECTRONIC DEVICE WITH SAME

BACKGROUND

1. Technical Field

The present disclosure relates to rotating mechanisms for rotatably connecting different bodies, and more particularly, to a rotating mechanism capable of adjusting a relative rotation angle between the different bodies.

2. Description of Related Art

An electronic device, such as a cellular phone or a notebook computer, can include two parts rotatably connected to each other. However, when the electronic device is used, time is required to adjust an angle between the two parts, which is inconvenient.

Therefore, it is desirable to provide a means which can overcome the above-mentioned problems.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Embodiments of the present disclosure will now be described in detail below, with reference to the accompanying drawings.

Figure 1:
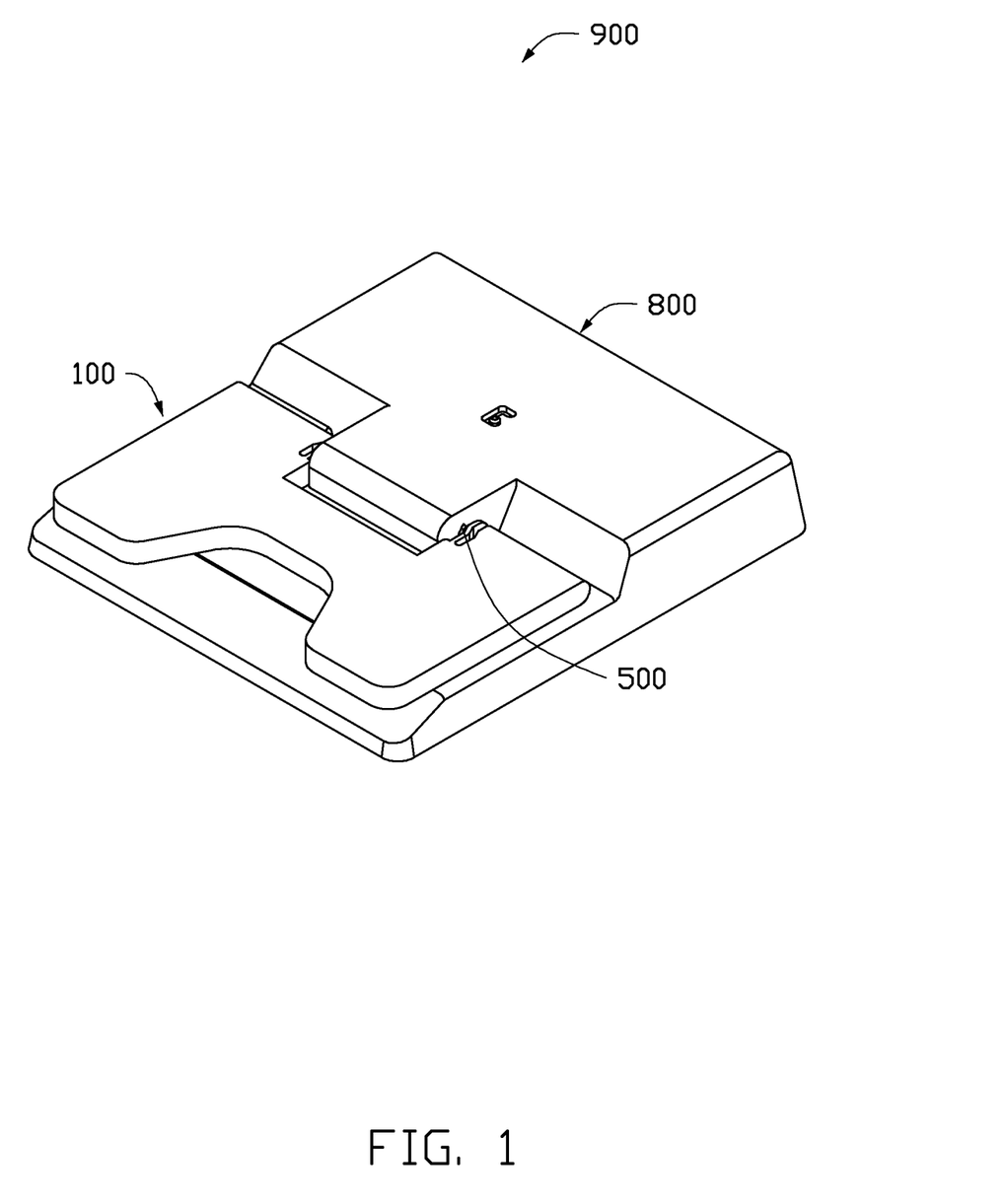
FIG. 1 is an isometric view of an electronic device according to an exemplary embodiment, showing that the electronic device includes a first body and a second body, and the second body is rotated to close the first body.
Figure 2:
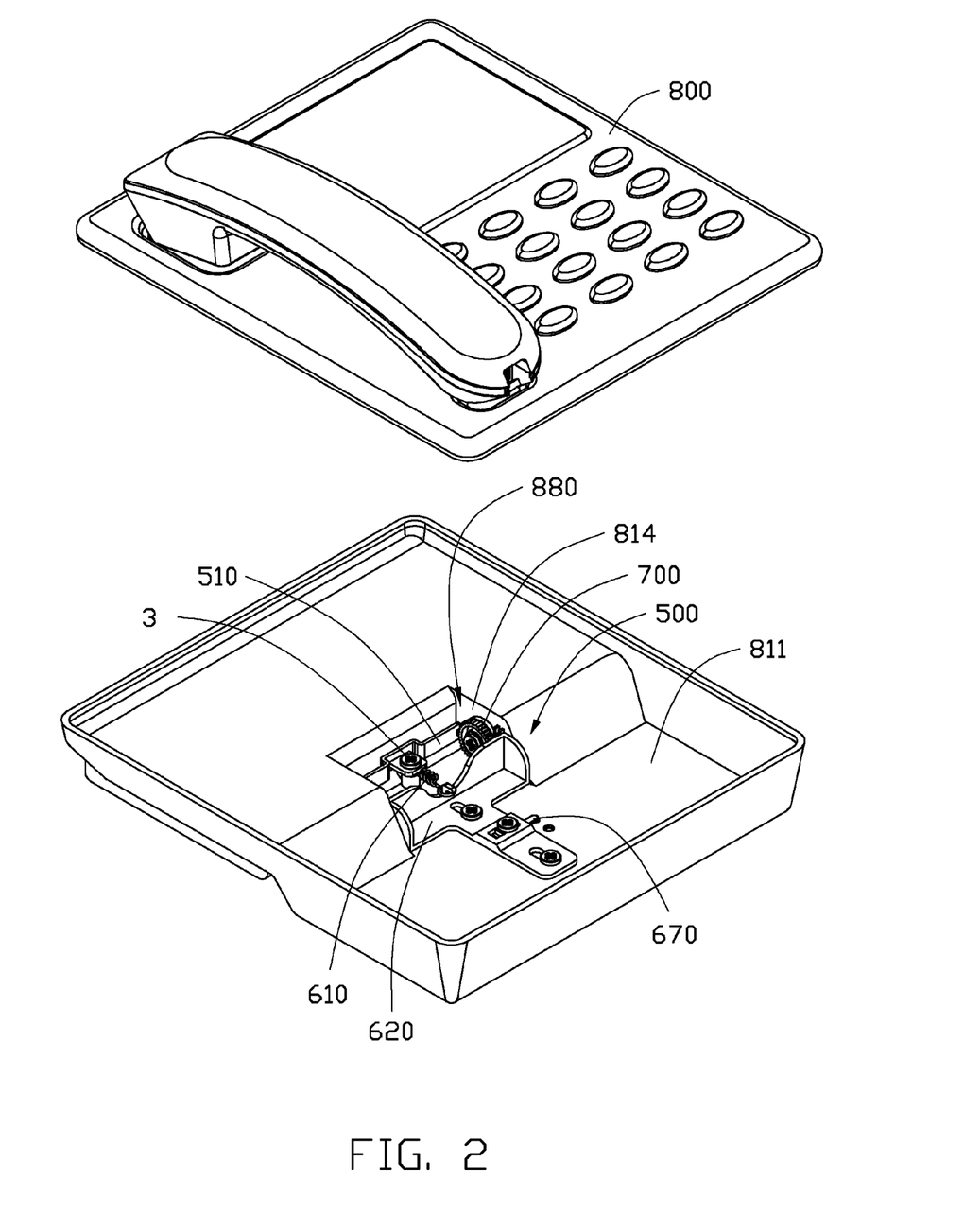
FIG. 2 is an isometric view of the electronic device of FIG. 1, viewed from another angle.

FIGS. 1 and 2 illustrate an electronic device 900 in accordance with an exemplary embodiment. The electronic device 900 includes a first body 800, a second body 100, and a rotating mechanism 500 rotatably connecting the first body 800 to the second body 100. In this embodiment, the electronic device 900 is a telephone. The first body 800 is a base with a receiver. The second body 100 is a support rotatably connected to a bottom of the base for supporting the base at a predetermined angle.

The first body 800 includes a pair of sidewalls 814 and a base board 811 perpendicularly connected to the sidewalls 814. The second body 100 is rotatably connected to the sidewalls 814. The first body 800 defines a receiving space 880 between the pair of sidewalls 814 for accommodating the rotating mechanism 500.

Figure 3:
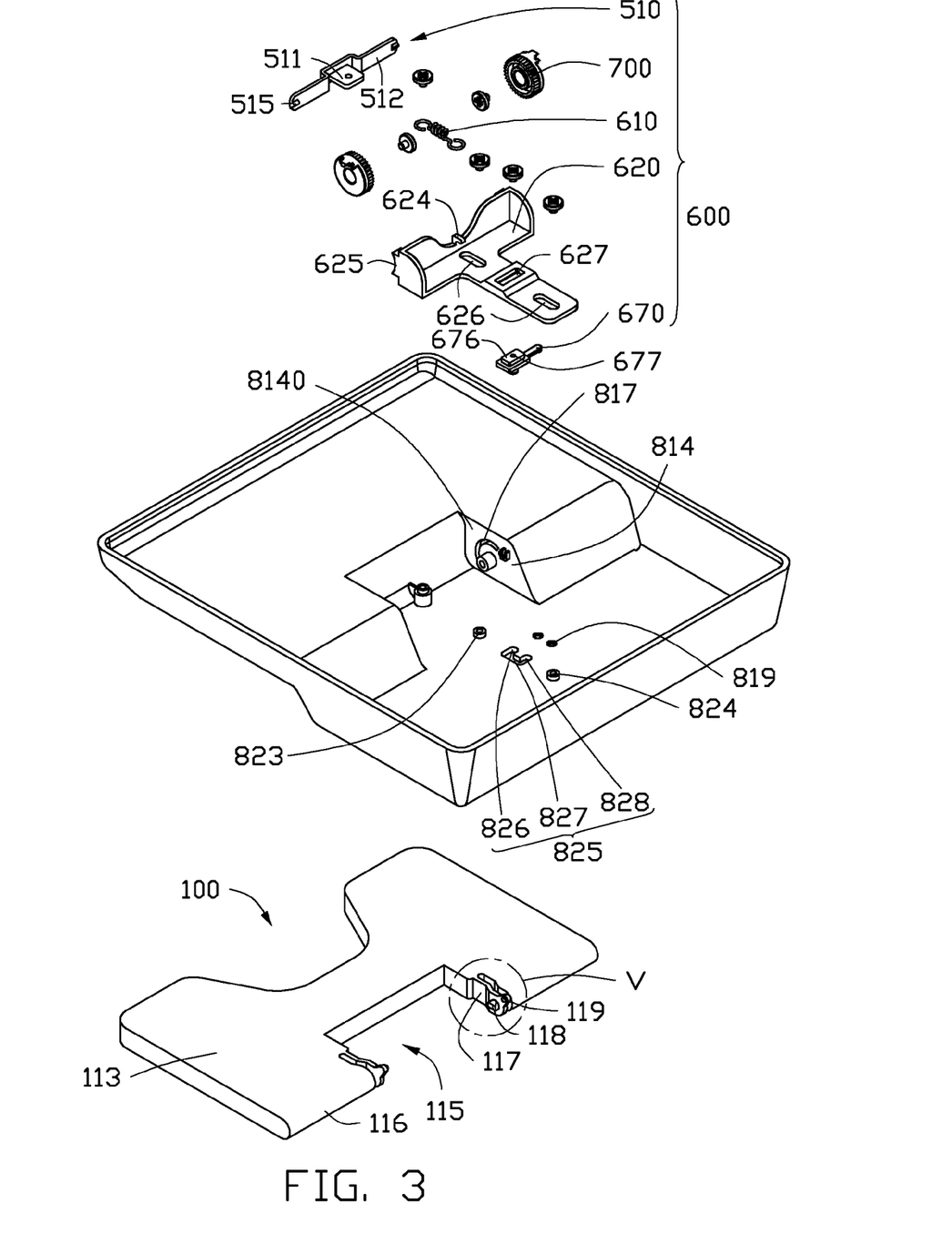
FIG. 3 is an exploded, isometric, schematic view of the electronic device of FIG. 2, showing that the electronic device includes a rotating mechanism, and the rotating mechanism includes a pair of positioning gears and a brake.
Figure 4:
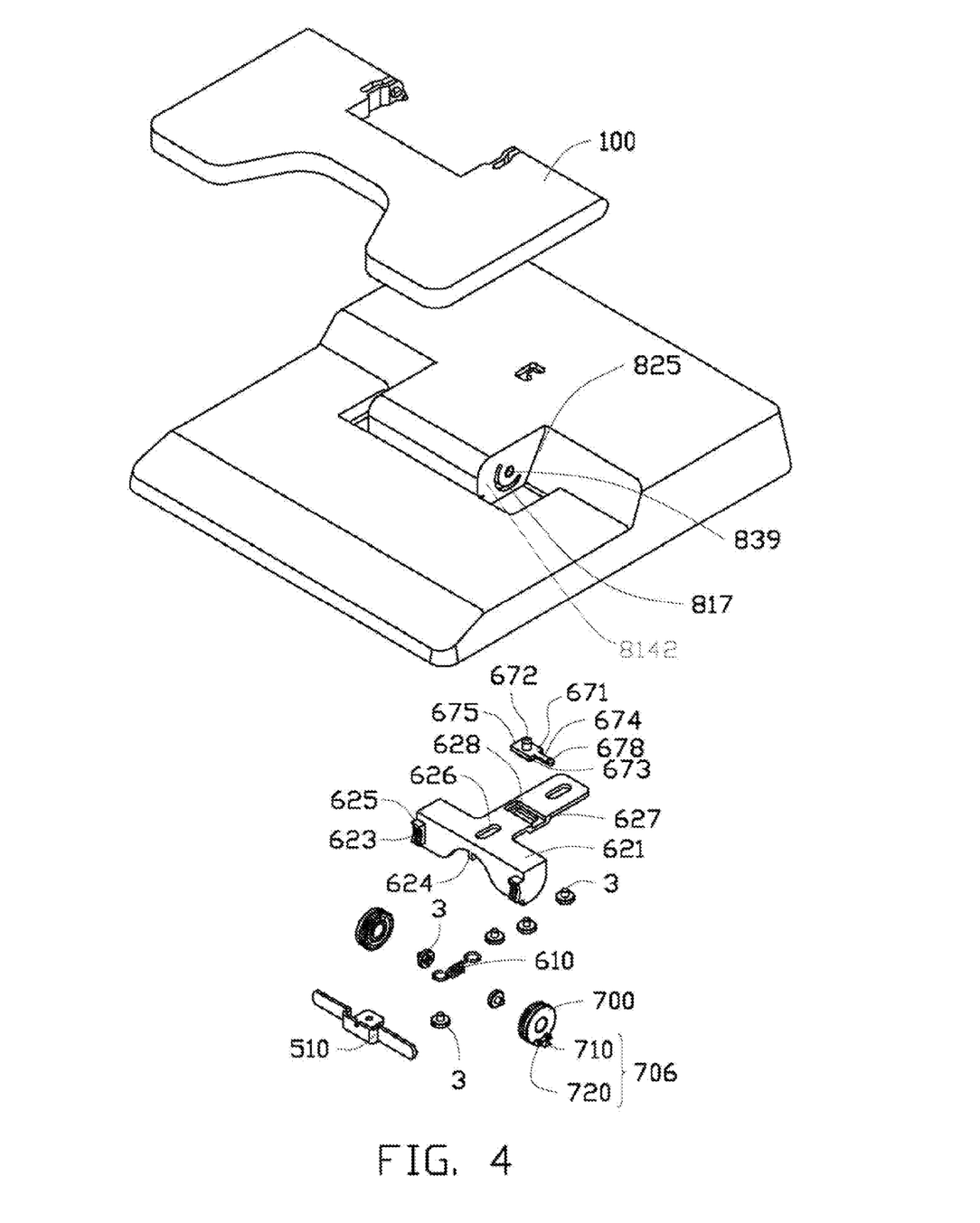
FIG. 4 is similar to FIG. 3, but viewed from another angle.

FIGS. 3 and 4 show that each of the sidewalls 814 includes an outer surface 8140 and an inner surface 8142. Each of sidewalls 814 defines a connecting hole 839 in the outer surface 8140 and a guiding groove 817 passing through the outer surface 8140 and the inner surface 8142. In this embodiment, the guiding groove 817 is substantially a semicircle, and the connecting hole 839 is defined at a center of the guiding groove 817.

The first body 800 defines a button 670 through hole 825 and a pair of positioning holes 819 in the base board 811. The button 670 through hole 825 and the positioning holes 819 are defined between the pair of sidewalls 814. The button through hole 825 includes a connecting part 827 extending along a direction parallel to the sidewalls 814 and a pair of positioning parts 826 and 828 correspondingly extending from two opposite ends of the connecting part 827. The positioning parts 826 and 828 extend along a direction perpendicular to the sidewalls 814. The positioning holes 819 are defined corresponding to the positioning parts 826 and 828.

The second body 100 includes a supporting part 113 and a pair of connecting arms 117 extending from the supporting part 113. The supporting part 113 is substantially a rectangular block and includes a connecting periphery 116 engaging with the first body 800. The supporting part 113 defines a gap 115 at a middle of the connecting periphery 116. The connecting arms 117 correspondingly extend from a pair of parallel inner surface of the gap 115. The connecting arms 117 extend along a direction perpendicular to the connecting periphery 116.

Figure 5:
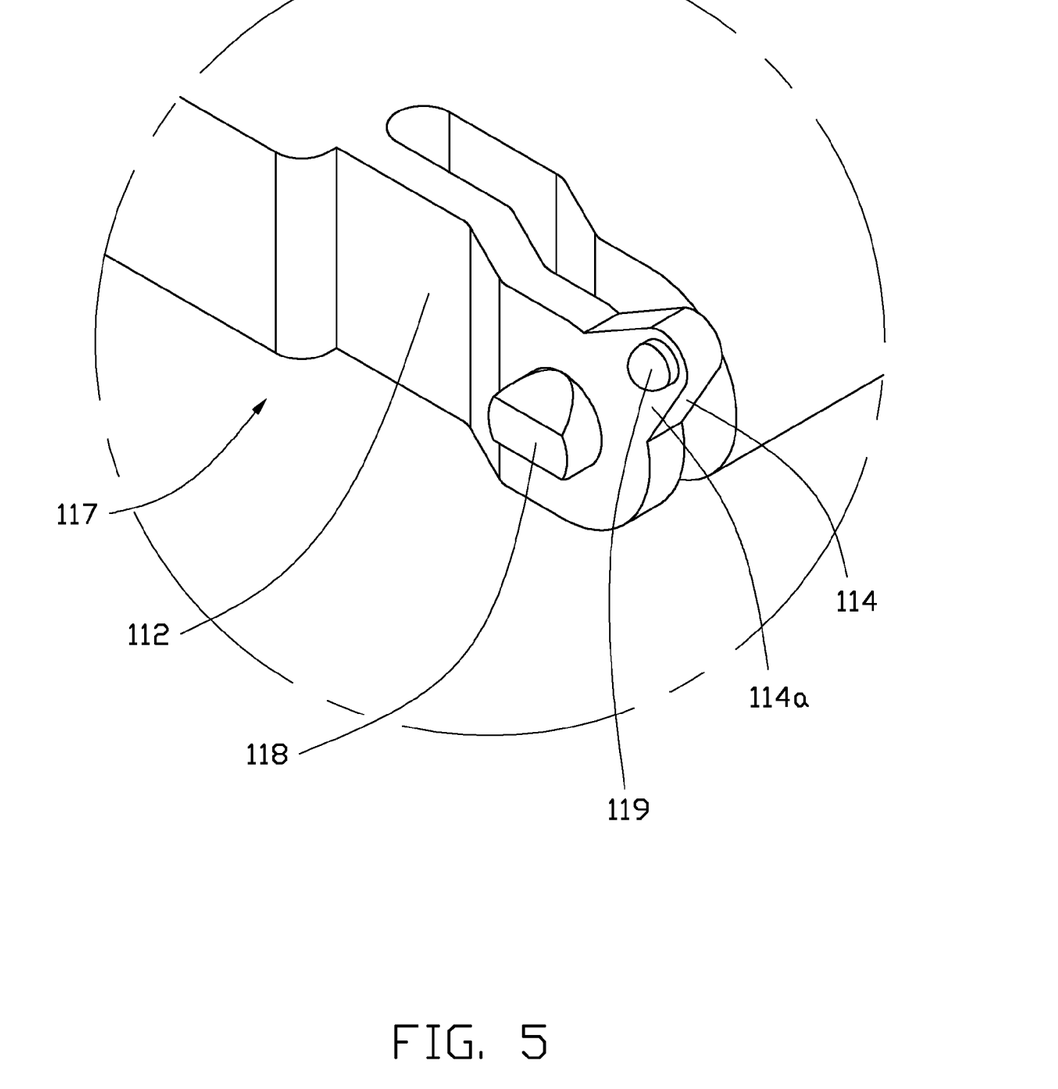
FIG. 5 is an enlarged, isometric view of a portion of V of FIG. 3.

FIG. 5 shows that each of the connecting arms 117 includes an engaging surface 112 facing the other connecting arm 117, a connecting bump 118, a guiding projection 114, and a positioning bump 119. The connecting bump 118 extends from the engaging surface 112 at a position closing the connecting periphery 116. The guiding projection 114 extends from an end of the connecting arm 117 closing the connecting periphery 116. The guiding projection 114 includes a connecting surface 114a coplanar with the engaging surface 112. The positioning bump 119 extends from the connecting surface 114a. The second body 100 is made of a resilient material.

FIGS. 3 and 4 show that the rotating mechanism 500 includes a positioner 510, a pair of positioning gears 700, a spring 610, a brake 620, and a button 670. The positioner 510 includes a fastening part 511 and a pair of engaging parts 512 extending from two opposite sides of the fastening part 511. Each of the engaging parts 512 includes a positioning projection 515 extends from an end of the engaging parts 512 away from the fastening part 511. The positioner 510 is made of a resilient material.

Figure 6:
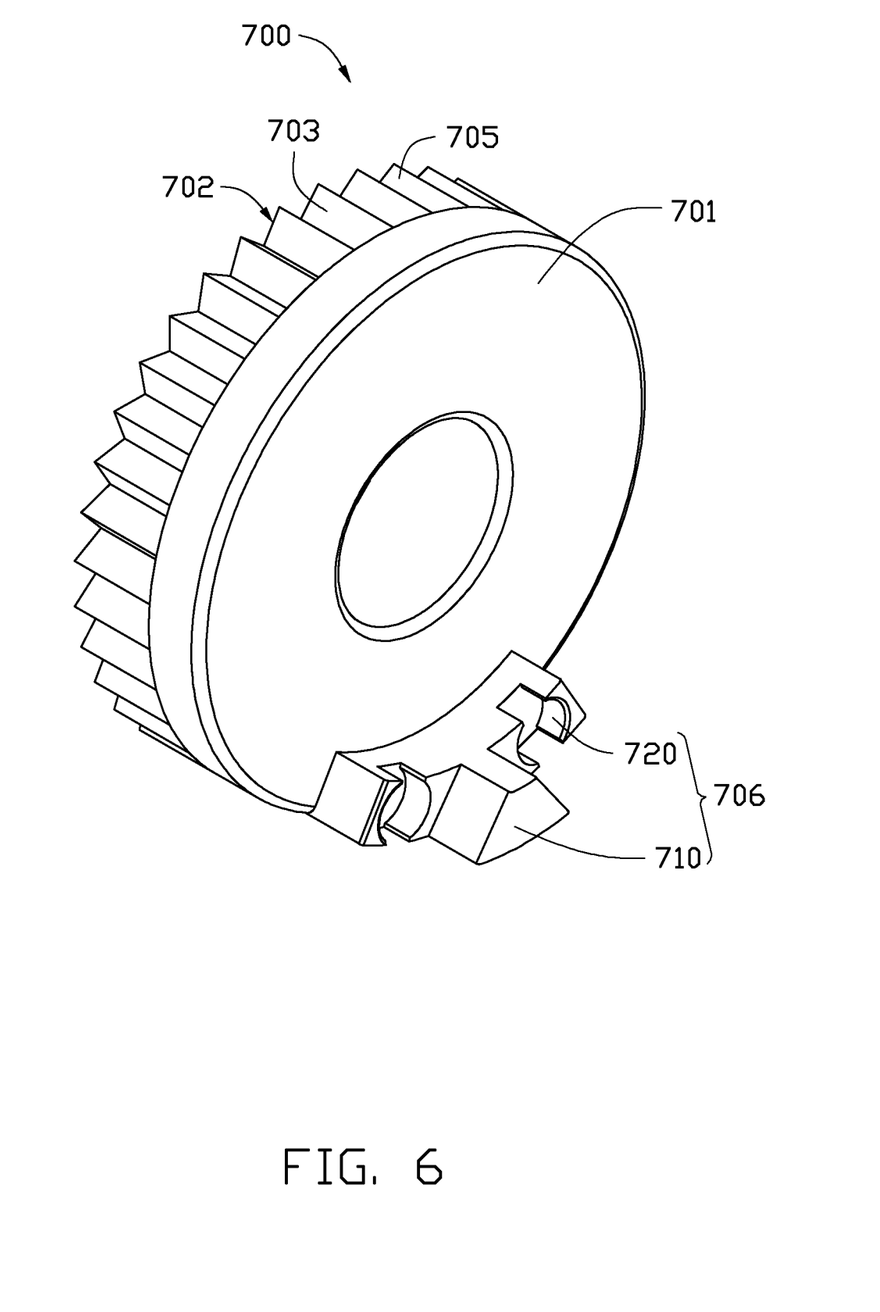
FIG. 6 is an enlarged, isometric view of positioning gear of FIG. 3.

FIG. 6 shows that each of the positioning gears 700 is a circular plate and includes a positioning surface 701, an assembly surface 702 parallel to the positioning surface 701, a circumferential surface 703 connecting the positioning surface 701 with the assembly surface 702, a number of teeth 705 formed on the circumferential surface 703, and a positioning block 706 formed on the positioning surface 701. The positioning block 706 is curved and extends along a part of a circumferential periphery of the positioning surface 701 and includes a dividing pillar 710 and a pair of positioning grooves 720 correspondingly defined at two opposite sides of the dividing pillar 710.

FIGS. 3 and 4 show that the brake 620 is "T" shaped and includes a braking part 621 and a controlling part 622 perpendicularly extending from a middle of the braking part 621. The braking part 621 includes a hook 624 and a pair of braking projections 625. The hook 624 is formed at the middle of the braking part 621. The pair of braking projections 625 correspondingly extends from two opposite ends of the braking part 621. The braking projections 625 extend along a direction opposite to the extending direction of the controlling part 622. Each of the braking projections 625 includes a number of braking teeth 623 formed on a front surface of each braking projection 625 away from the controlling part 622.

The brake 620 defines at least one elongated sliding through hole 626 and an elongated controlling through hole 627 in the controlling part 622. The sliding through hole 626 extends along a direction perpendicular to the braking part 621. The controlling through hole 627 extends along a direction parallel to the braking part 621. The brake 620 defines a receiving groove 628 corresponding to the controlling through hole 627 to receive the button 670.

The button 670 includes a main body 671 and a positioning pole 674 extending from the main body 671. The main body 671 includes a first surface 675, a second surface 676 parallel to the first surface 675, and a controlling projection 672 extending from the first surface 675. The main body 671 defines an assembly hole 677 in the second surface 676. The positioning pole 674 includes a resisting surface coplanar with the first surface 675 and a positioning protrusion 678 extending from the resisting surface. The positioning protrusion 678 is located at an end of the positioning pole 674 away from the main body 671.

Figure 7:
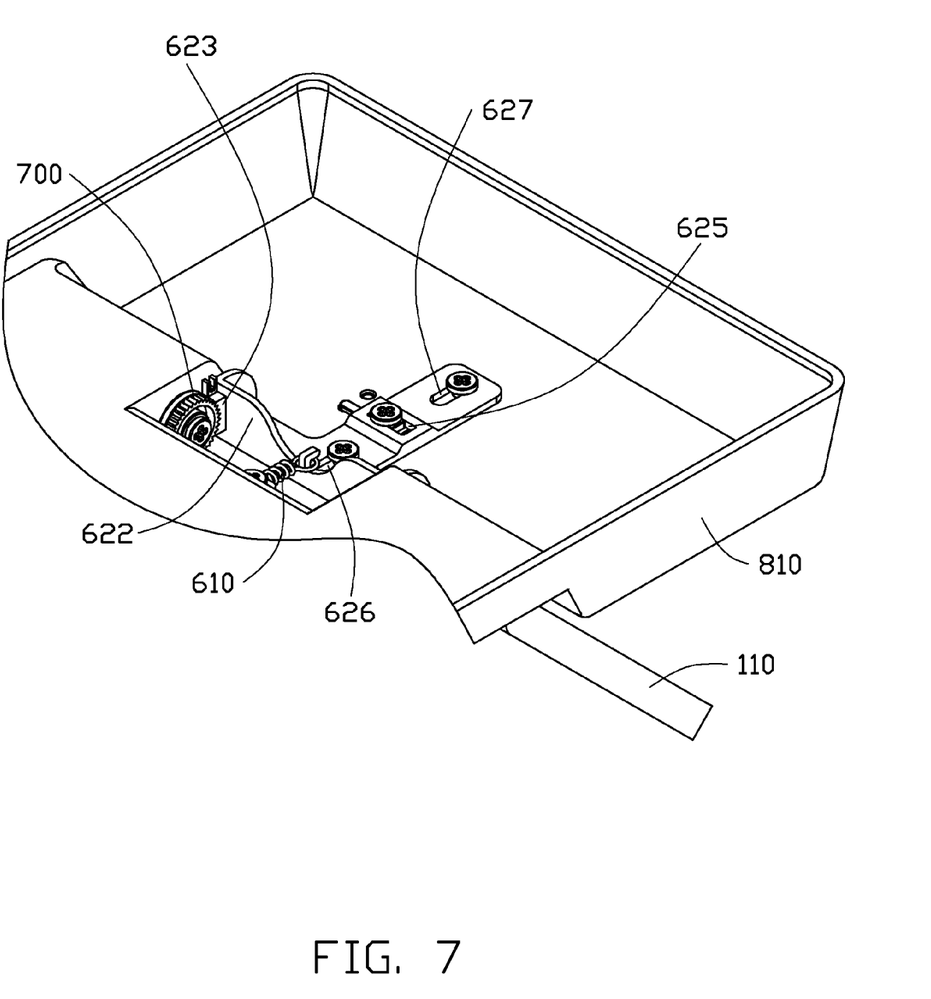
FIG. 7 is a partial assembled, isometric view of the electronic device of FIG. 1, showing that the brake contacts with the positioning gears.
Figure 8:
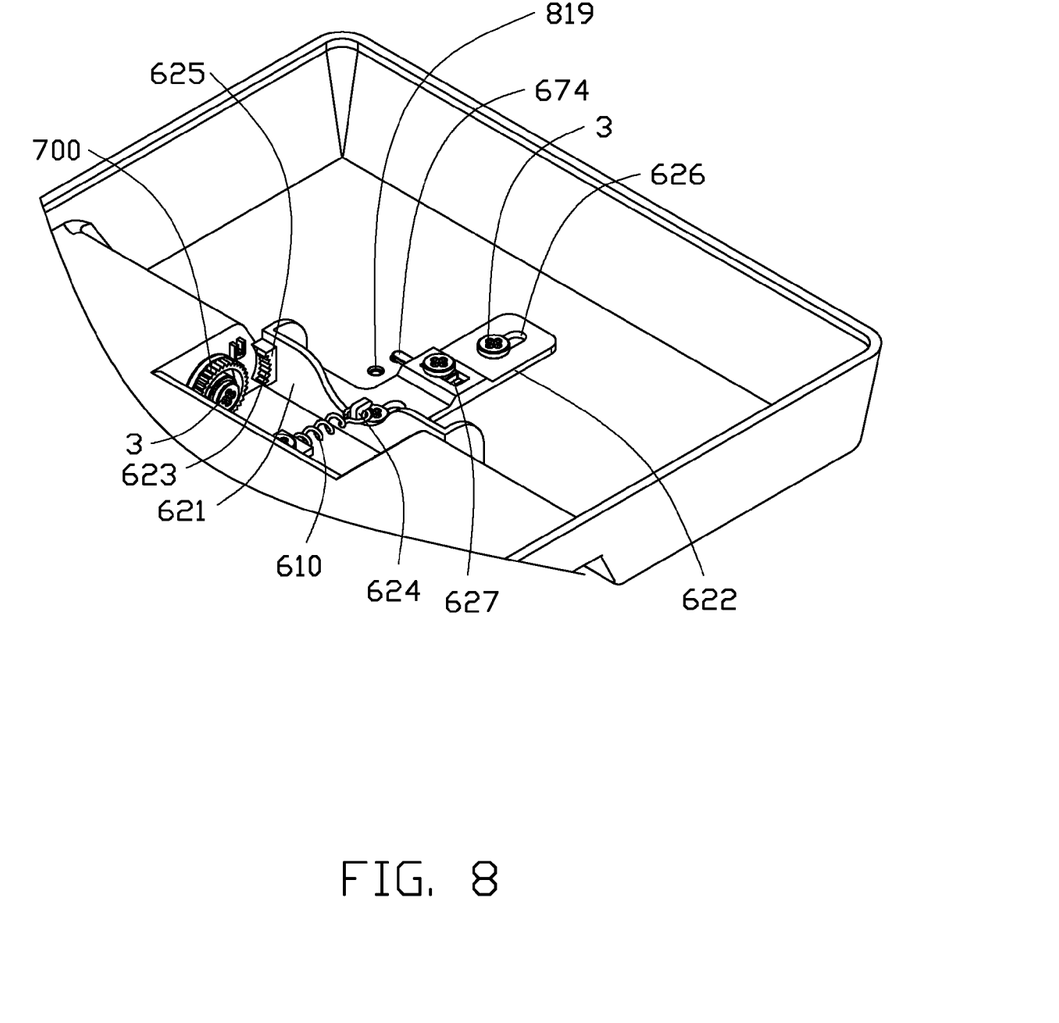
FIG. 8 is similar to FIG. 7, showing that the brake is pulled away from the positioning gears.

FIGS. 2, 7 and 8 show that, in assembly, the positioner 510 is fixed to the base board 811 via a bolt 3 and located between the sidewalls 814. The brake 620 is slidably connected to the base board 811 by at least one bolt 3 passing through the sliding through hole 626 and screwing into a fastening block on the base board 811. The positioner 510 and the brake 620 are correspondingly located at two opposite sides of the guiding grooves 817. The button 670 is received in the receiving groove 628. The button 670 is slidably connected to the controlling part 622 by a bolt 3 passing through the controlling through hole 627 and screwing into the assembly hole 677. The controlling projection 672 is exposed out of the second body 100 by passing through the button through hole 825. The positioning protrusion 678 inserts into the positioning hole 819 to position the button 670.

One end of the spring 610 is fastened to the fastening part 511. The other end of the spring 610 is connected to the hook 624. The positioning gears 700 are rotatably connected to the inner surface 8142 of the side wall via a pair of bolt 3s. The positioning surface 701 resists against the inner surface 8142. The positioning block 706 extends out of the second body 100 by passing through the guiding groove 817. The positioning block 706 slides along the sliding groove when the positioning gear rotates on the inner surface 8142. The positioning projection 515 engages with the teeth 705 of the positioning gear to restrict the positioning gear rotate at an angle between two adjacent teeth 705 each time. The second body 100 is rotatably connected to the sidewalls 814 by the connecting bump 118s correspondingly inserting in the connecting hole 839. The positioning bump 119s correspondingly insert in the positioning groove to position the rotation angle of the second body 100.

Figure 9:
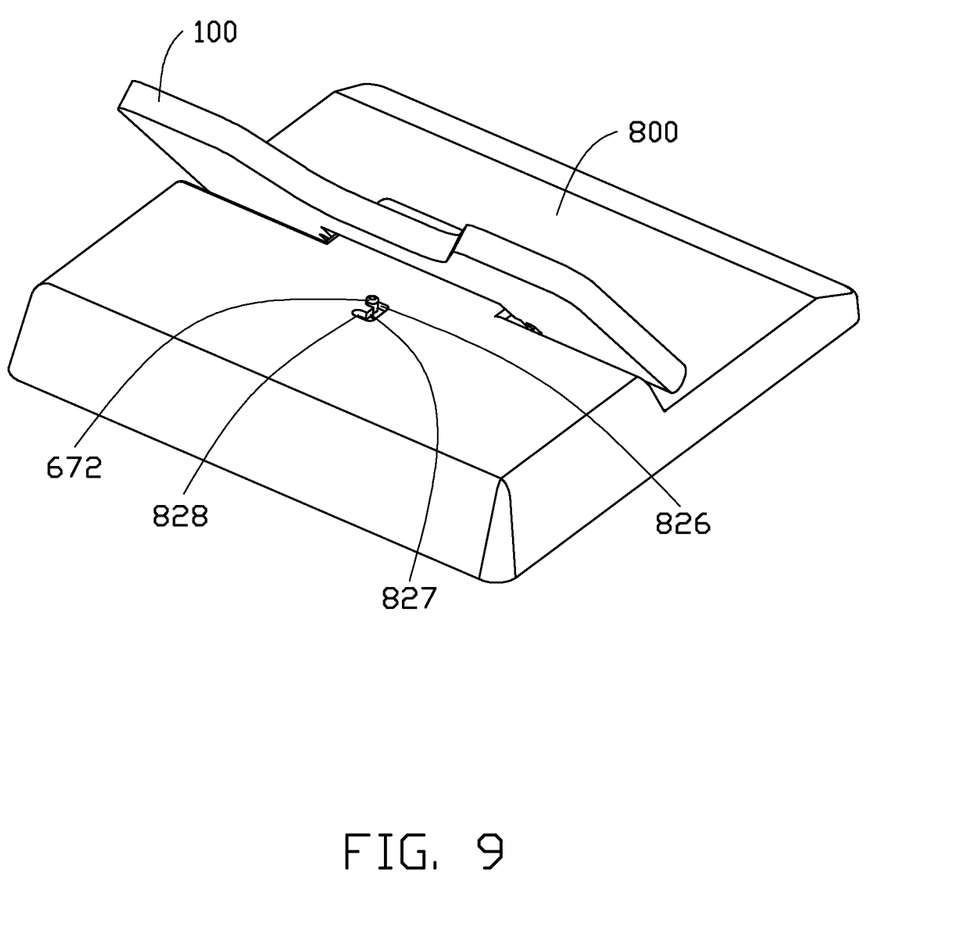
FIG. 9 is similar to FIG. 1, but shows that the second body is rotated away from the first body.

FIGS. 8 and 9 show that, in use, when the controlling projection 672 stays in the positioning part 828 away from the sidewalls 814, the braking projection 625 is pulled away from the positioning gears 700, and the positioning gears 700 are driven to rotate by the second body 100 with the positioning bump 119 correspondingly inserting in the positioning grooves 720. When the second body 100 is rotated to a predetermined rotation angle, to move controlling projection 672 to the other positioning part 826 closing the sidewalls 814, the brake 620 is forced to slide towards the positioning gears 700 by the controlling projection 672, and the braking teeth 623 of the braking projection 625 engage with the teeth 705 of the positioning gears 700 to stop the rotation of the positioning gears 700. Thus, the positioning block 706 is fixed at a same position in the guiding groove 817, and the second body 100 is rotated to the predetermined rotation angle without any adjustment by the positioning bump 119 correspondingly inserting in the positioning grooves 720 of the positioning block 706.

While various exemplary and preferred embodiments have been described, it is to be understood that the disclosure is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A rotating mechanism rotatably connecting a first body with a second body, the first body comprising a pair of sidewalls, the second body comprising a pair of connecting arms, each of the connecting arms comprising a positioning bump, the rotating mechanism comprising:
    a pair of positioning gears rotatably connected to one side of the respective sidewalls, and each of the positioning gears comprising a positioning block extending through the respective sidewall by passing through a guiding grooves;
    a brake slidably connected to the first body along a direction parallel to the sidewalls; and
    a button fastened to the brake and slidable between a first position closing the sidewalls and a second position away from the sidewalls;
    wherein the connecting arms are rotatably connected to another side of the respective sidewalls opposite to the positioning gears, the positioning bump engages with the positioning block to position the rotation angle of the second body, the brake is pulled away from the positioning gears by the button to drive the positioning gears to rotate with the positioning bump when the button stays at the first position, the brake is driven to engage with the positioning gears and brake the rotation of the positioning gears by the button when the button is moved to the second position, and the positioning block is fixed at a predetermined position to position the rotation angle of the second body when the positioning gears are braked by the brake.

2. The rotating mechanism of claim 1, further comprising a positioner fixed to the first body and located between the pair of sidewalls, wherein the positioner and the brake are correspondingly located at two opposite sides of the positioning gears, the positioner comprises a fastening part connecting with the first body and a pair of engaging parts extending from two opposite sides of the pair of fastening parts, and each of the engaging parts comprises a positioning projection extending from an end of the engaging part away from the fastening part.

3. The rotating mechanism of claim 2, wherein each of the positioning gears further comprises a positioning surface, an assembly surface parallel to the positioning surface, a circumferential surface connecting the positioning surface with the assembly surface, and a plurality of teeth formed on the circumferential surface, and the positioning projection engages with the teeth of the positioning gears to restrict the positioning gears rotate an angle between two adjacent teeth each time.

4. The rotating mechanism of claim 3, wherein the positioning block is formed on the positioning surface, the positioning block comprises a dividing pillar and a pair of positioning grooves correspondingly defined at two opposite sides of the dividing pillar, and each of the positioning bumps engage with the positioning block by inserting in the corresponding positioning groove to position the rotation angle of the positioning gears.

5. The rotating mechanism of claim 3, wherein the positioning block is curved and extends along a part of a circumferential periphery of the positioning surface.

6. The rotating mechanism of claim 2, wherein the brake comprises a braking part and a controlling part perpendicularly extending from a middle of the braking part, the braking part comprises a pair of braking projections correspondingly extending from two opposite ends of the braking part, each of the braking projections comprises a plurality of braking teeth formed on a front surface of each braking projection away from the controlling part, and the braking teeth engage with the teeth of the positioning gears to brake the rotation of the positioning gears when the brake is driven to contact with the positioning gears.

7. The rotating mechanism of claim 6, wherein the brake further comprises a hook formed at the middle of the braking part, the rotating mechanism further comprises a spring, one end of the spring is fastened to the fastening part, and the other end of the spring is connected to the hook.

8. The rotating mechanism of claim 6, wherein the brake defines at least one elongated sliding through hole in the controlling part, the sliding through hole extends along a direction perpendicular to the braking part, and the brake is slidably connected to the first body by at least one bolt passing through the sliding through hole and screwing into a fastening block formed on the first body.

9. The rotating mechanism of claim 8, wherein the button comprises a main body and a positioning pole extending from the main body, the main body comprises a controlling projection extending out of the first body via a button through hole defined in the first body, the positioning pole comprises a positioning protrusion, and the positioning protrusion inserts in one of a pair of positioning holes corresponding to the first position and the second position to position the button at the first position or the second position.

10. An electronic device comprising: a first body comprising a pair of sidewalls;
a second body comprising a pair of connecting arms and each of the connecting arms comprising a positioning bump;
a rotating mechanism for rotatably connecting the first body with the second body comprising:
a pair of positioning gears rotatably connected to one side of the respective sidewalls, and each of the positioning gears comprising a positioning block extending through the respective sidewall by passing through a guiding groove;
a brake slidably connected to the first body along a direction parallel to the sidewalls; and
a button fastened to the brake and slidable between a first position closing the sidewalls and a second position away from the sidewalls;
wherein the connecting arms are rotatably connected to another side of the respective sidewalls opposite to the positioning gears, the positioning bump engages with the positioning block to position the rotation angle of the second body, the brake is pulled away from the positioning gears by the button to drive the positioning gears to rotate with the positioning bump when the button stays at the first position, the brake is driven to engage with the positioning gears and brake the rotation of the positioning gears by the button when the button is moved to the second position, and the positioning block is fixed at a predetermined position to position the rotation angle of the second body when the positioning gears are braked by the brake.

11. The electronic device of claim 10, wherein each of the sidewalls comprises an inner surface and an outer surface and defines a connecting hole in the outer surface and a guiding groove passing through the outer surface and the inner surface, the connecting arms are rotatably connected to the outer surface by inserting in the connecting hole, the positioning gears are rotatably connected to the inner surface, and the positioning block extends out of the first body by passing through the guiding groove.

12. The electronic device of claim 10, further comprising a positioner fixed to the first body and located between the pair of sidewalls, wherein the positioner and the brake are correspondingly located at two opposite sides of the positioning gears, the positioner comprises a fastening part connecting with the first body and a pair of engaging parts extending from two opposite sides of the pair of fastening parts, and each of the engaging parts comprises a positioning projection extending from an end of the engaging part away from the fastening part.

13. The electronic device of claim 12, wherein each of the positioning gears further comprises a positioning surface, an assembly surface parallel to the positioning surface, a circumferential surface connecting the positioning surface with the assembly surface, and a plurality of teeth formed on the circumferential surface, and the positioning projection engages with the teeth of the positioning gears to restrict the positioning gears rotate an angle between two adjacent teeth each time.

14. The electronic device of claim 13, wherein the positioning block is formed on the positioning surface, the positioning block comprises a dividing pillar and a pair of positioning grooves correspondingly defined at two opposite sides of the dividing pillar, and each of the positioning bumps engage with the positioning block by inserting in the corresponding positioning groove to position the rotation angle of the positioning gears.

15. The electronic device of claim 13, wherein the positioning block is curved and extends along a part of a circumferential periphery of the positioning surface.

16. The electronic device of claim 12, wherein the brake comprises a braking part and a controlling part perpendicularly extending from a middle of the braking part, the braking part comprises a pair of braking projections correspondingly extending from two opposite ends of the braking part, each of the braking projections comprises a plurality of braking teeth formed on a front surface of each braking projection away from the controlling part, and the braking teeth engage with the teeth of the positioning gears to brake the rotation of the positioning gears when the brake is driven to contact with the positioning gears.

17. The electronic device of claim 16, wherein the brake further comprises a hook formed at the middle of the braking part, the rotating mechanism further comprises a spring, one end of the spring is fastened to the fastening part, and the other end of the spring is connected to the hook.

18. The electronic device of claim 16, wherein the brake defines at least one elongated sliding through hole in the controlling part, the sliding through hole extends along a direction perpendicular to the braking part, and the brake is slidably connected to the first body by at least one bolt passing through the sliding through hole and screwing into a fastening block formed on the first body.

19. The electronic device of claim 18, wherein the button comprises a main body and a positioning pole extending from the main body, the main body comprises a controlling projection extending out of the first body via a button through hole defined in the first body, the positioning pole comprises a positioning protrusion, and the positioning protrusion inserts in one of a pair of positioning holes corresponding to the first position and the second position to position the button at the first position or the second position.

* * * * *